Jan. 12, 1932.  C. J. KING  1,840,723
CONTROL SYSTEM FOR ROASTER FURNACES
Filed July 16, 1929
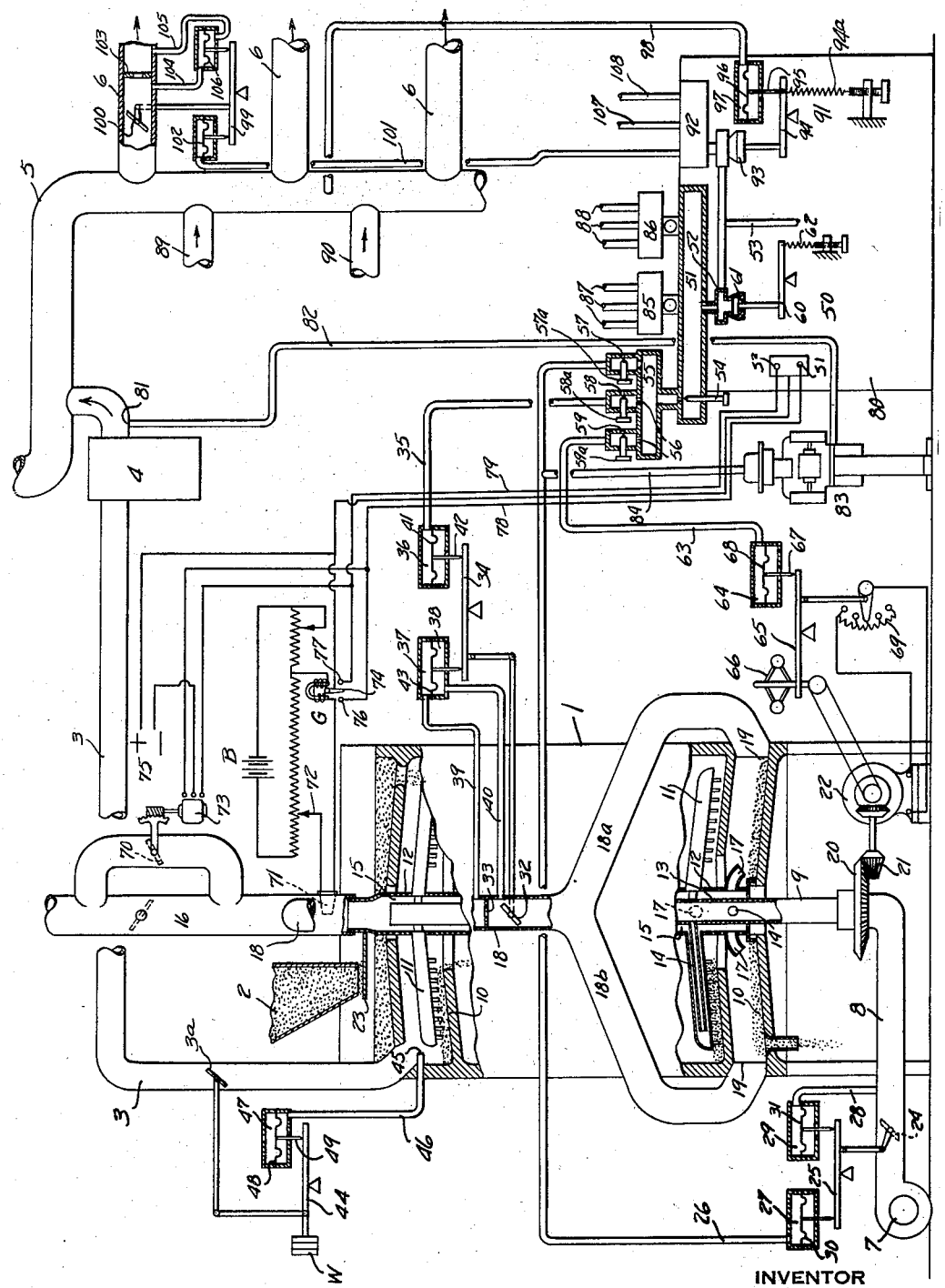
INVENTOR
Cyril J. King
BY Bartlett, Eyre, Scott & Keel
ATTORNEYS Patented Jan. 12, 1932

1,840,723

UNITED STATES PATENT OFFICE

CYRIL J. KING, OF FLUSHING, NEW YORK, ASSIGNOR TO SMOOT ENGINEERING CORPORATION, OF NEW YORK, N. Y., A CORPORATION OF DELAWARE

CONTROL SYSTEM FOR ROASTER FURNACES

Application filed July 16, 1929. Serial No. 378,625.

My invention relates to the art of regulation and comprises a complete system of automatic control of combustion for roaster furnaces and of the distribution of the produced gas, whereby efficient operation of the entire plant is maintained with a minimum of labor.

More specifically, my invention comprises a system in which the air for combustion, the air for cooling, the fuel feed, the temperature, the composition of the gas produced, and the distribution thereof may each be automatically regulated from a central point. My regulating system may be advantageously employed in any kind of roaster furnace, whether of the modern type using preheated forced draft for secondary air, or of the older type in which the secondary air is obtained by induction and is not preheated. My system includes means whereby any number of furnaces may be controlled at the same or at different ratings, and individual furnaces may be cut out from operation without affecting the regulation of the remaining furnaces. By the use of my regulating system, not only is more efficient operation of the plant insured, but also a more uniform gaseous product and a better distribution thereof to points of use are obtained. Safety in operation is provided for by automatic control of temperature of each furnace.

For a better understanding of my invention, reference should be had to the accompanying drawing in which I have shown, more or less diagrammatically, the gas distribution system of a roaster plant, and one furnace thereof, partly in section, and equipped with one embodiment of my complete regulating system.

In the drawing, one of a battery of large roaster furnaces of the modern type is indicated at 1 with parts of the outer wall broken away to show the interior thereof. Ore for roasting is delivered through a hopper 2 to the upper stage of the furnace and the produced gas is delivered through a conduit 3 and precipitator 4 to the common collecting main 5 for all the furnaces of the battery. From the main 5, branch pipes 6 distribute the produced gas to points of use. In the case of sulphur bearing ores the produced gas, $SO_2$, may be distributed through pipes 6 to towers (not shown) in which sulphuric acid gas is generated.

Air for combustion and for cooling purposes is supplied under pressure by a blower 7 through a conduit 8 to the central hollow shaft 9 of the furnace. The furnace contains a number of stages, each of which comprises an inclined bed 10 upon which the ore is roasted in contact with air and upon which it is stirred and caused to pass to the next lower stage by continuously rotating rakes 11. Central shaft 9 is double walled throughout so much of its length as is positioned within the furnace. The outer wall 12 of shaft 9 has mounted thereupon at intervals along its length the radially disposed rakes 11 comprising branch pipes closed at their outer ends and carrying projections for stirring and progressively moving the ore. In the particular furnace illustrated, two rakes are shown for each stage of the furnace. The inner wall 13 of shaft 9 has mounted thereupon radially disposed branch pipes 14 each of which extends into a rake 11 and is open at its outer end to permit air for cooling and for combustion to pass from the center of shaft 9 through the branch pipes 14 and interior of the rakes into the annular chamber 15 between walls 12 and 13. Chamber 15 is closed at its lower end at the entrance to the furnace and communicates with the flue 16 at the upper end of the furnace. Openings 17, in the present instance two to each stage, are provided in the wall 12 whereby primary air for combustion may pass from chamber 15 into each stage of the furnace. Instead of the openings 17 in the wall 12, openings for the primary air may be provided in the rakes 11 between the prongs.

In the older type of roaster furnace, secondary air for combustion is induced through openings in the furnace wall. In the modern type illustrated, the secondary air comprises that part of the heated air entering flue 16 from the furnace which passes through a conduit 18 and pipes 18a and 18b branching therefrom into the combustion chamber of the lowest stage of the furnace through openings 19.

Shaft 9 at its lower end has mounted thereon a gear wheel 20 through which it is rotated by a gear 21 mounted on the shaft of an electric motor 22. At the upper end of shaft 9 is mounted a member 23 which by rotation of the shaft controls the feed of ore to the furnace in the well known manner.

It has been thought necessary for a complete understanding of my novel automatic regulating system for roaster furnaces and for the gas distribution therefrom, to give the above somewhat detailed description of a typical roaster plant. It will be understood, however, that my invention is not concerned with the particular construction of the furnaces nor with the particular arrangement within the plant of the various devices used in gas production, but relates to the combination of my novel regulating system with such known devices. My regulating system includes co-ordinated controlling means for the air, the fuel, the temperature, the composition of the produced gas and the distribution thereof. The air controlling means comprise a damper 24 in the conduit 8 controlled by the position of a balancing device which device is shown diagrammatically as a pivoted lever 25 moved in response to a controlling pressure transmitted through a pipe 26 to a chamber 27 and in response to the pressure between damper 24 and the entrance to hollow shaft 9, transmitted through pipe 28 to a chamber 29. Chambers 27 and 29 are closed by diaphragms 30 and 31 respectively to which rods are attached to bear against opposite ends of lever 25. Lever 25 is connected by suitable linkage to damper 24. Additional air controlling means comprise a damper 32 positioned in the conduit 18 through which the preheated secondary air flows to the lowest stage of the furnace. A constriction 33 is placed in the conduit 18 and damper 32 is controlled by the position of a second balancing device also shown diagrammatically as a pivoted lever 34 moved in response to a controlling pressure transmitted through a pipe 35 to a chamber 36 and in response to the air flow passing constriction 33 as measured by the pressure at either side thereof transmitted to chambers 37 and 38 by pipes 39 and 40 respectively. Chamber 36 is closed by a diaphragm 41 to which is attached one end of a rod 42 the other end of which bears upon lever 34 to transmit thereto a force varying with the controlling pressure. Chambers 37 and 38 are separated by a diaphragm 43 which likewise has a rod attached thereto to transmit to lever 34 a force varying with the differential of the pressures in these chambers. In addition to the air controls above described, I provide controlling means for the furnace pressure to maintain the same constant, and preferably equal to that of the atmosphere. These controlling means comprise a balancing device 44 which in the embodiment illustrated adjusts the position of a damper 3a in the outlet pipe 3, in response to the pressure at any suitable point within the furnace, as for example, the point 45. Instead of the control of damper position, the speed of an exhauster or booster in pipe 3 could be substituted, when such are used in the plant. The pressure at the point 45 is transmitted through a pipe 46 to a chamber 47, which chamber is closed by a diaphragm 48. Diaphragm 48, which is exposed to atmospheric pressure on one side, and to furnace pressure on the other, has attached thereto a rod 49 which thus acts upon the lever 44 with a force varying with the difference between the pressure within the furnace and that of the atmosphere. A weight W on lever 44 balances thereupon the weight of rod 49 and diaphragm 48.

It will be noted, from the description of the furnace hereinbefore given, that all of the air for combustion and cooling is derived from the blower 7 through conduit 8; the primary air entering the furnace through openings 17, the secondary air passing from flue 16 through conduits 18, 18a and 18b into the furnace, and the part of the cooling air not used for combustion passing from chamber 15 into the flue. By co-ordinating the controlling pressures in pipes 26 and 35 leading to regulating devices 25 and 34 respectively, a predetermined ratio between the primary and secondary air flow is obtained as the secondary air flow is measured directly by the differential of pressures across constriction 33 and the primary flow is measured indirectly by the pressure in chamber 29 since the pressure within the furnace is maintained constant by regulating device 44. The co-ordination of the controlling pressures in pipes 26 and 35 may be effected in any well known manner. I prefer, however, to employ for this purpose a master controller of the type indicated at 50 in the drawing. Master controller 50 includes a chamber 51 to which air under pressure is admitted through a restricted opening 52 from a pipe 53 connected to any suitable source (not shown). Air from chamber 51 passes through a passage controlled by an adjustable throttling valve 54 into a chamber 55, from where it passes by way of restricted passages 56 and leakage ports 57, 58 and 59 into the atmosphere. A pivoted lever 60 carries at one end a cup valve 61 exposed to the pressure in chamber 51 and adapted to permit leakage of air therefrom. A manually adjustable spring 62 is connected to the other end of lever 60 and exerts a force thereupon in opposition to the force of the master air pressure acting on cup valve 61, whereby the cup valve is given such position as to maintain within chamber 51 a pressure determined by the adjustment of spring 62. Pipes 26 and 35 are connected to chamber 55 beyond the restricted ports 56 and adjacent leakage ports 57 and 58 respectively. The pressures in pipes 26 and 35 are thus controllable together by means of valve 54, or independently by means of valves 57a and 58a controlling the leakage through ports 57 and 58 respectively.

The fuel feed is correlated by my invention to the above described controls of primary and secondary air, by the control of the speed of rotation of motor 22 in response to a controlling pressure transmitted through a pipe 63 to a chamber 64 forming part of a regulating device 65. Regulating device 65 is indicated diagrammatically as comprising a pivoted lever maintained in equilibrium by a balance between a force varying with the speed of motor 22 as measured by a centrifugal governor 66 and a force varying with the pressure in chamber 64, as transmitted to the lever 65 by a rod 67 connected to a diaphragm 68 forming one wall of chamber 64. Regulator 65, upon departure from equilibrium adjusts the speed of motor 22 as by adjustment of a resistance 69 in the armature circuit of the motor. Pipe 63 is connected to chamber 55 adjacent leakage port 59 whereby the controlling pressure therein varies with the pressure in chamber 55, and may be independently adjusted by means of valve 59a controlling the leakage port 59.

To prevent excessive temperatures with consequent danger of burning out of the cast iron rakes or other parts of the furnace, I provide means for varying the amount of air for cooling without interfering with the primary and secondary air for combustion. These means comprise the control of a damper 70, in this instance shown located in a bypass of the flue 16, in response to the temperature as measured by a thermocouple 71 in contact with the air at the exit from the furnace. Thermocouple 71 is arranged in series with a galvanometer G in the bridging circuit of a potentiometer supplied with current from a battery B. The potentiometer current, or the sliding contact 72 of the bridging circuit is adjusted for no current through the galvanometer when the temperature is that desired. Damper 70 is positioned by a reversible electric motor 73 energized in one direction or the other whenever the needle 74 of the galvanometer departs from neutral to connect the motor in circuit with a source of electromotive force indicated diagrammatically by the terminals 75, by engagement of an electrical contact carried by the needle with either of stationary contacts 76 or 77: one terminal of the motor 73 being connected to the other side of the power circuit 75 and the other terminals being connected to contacts 76 and 77 respectively. Preferably contacts 76 and 77 are respectively connected by conductors 78 and 79 to push button switches $S_1$ and $S_2$ on a control board 80 whereby manual control of the damper 70 may be substituted for the temperature control, if desired; switches $S_1$ and $S_2$ having their other terminals connected to the source 75. The control of damper 70 as above described in no way varies the controlled ratio of primary to secondary air by regulating devices 25 and 34 nor does it affect the absolute value of the air flow of either, although the particular settings of dampers 24 and 32 will necessarily be changed by their respective controlling means upon each shift of damper 70 in varying the quantity of cooling air to maintain the temperature constant.

To control the composition of the gas produced I vary the ratio of the flow of primary air to the rate of fuel feed, and consequently to the rate of secondary air flow also. This I accomplish by varying the controlling pressure in pipe 26 independently of the master and in response to the density of the produced gas as measured at a point 81 in conduit 3, preferably beyond the precipitator 4. A small quantity of the gas is continuously drawn through a pipe 82 to a suitable regulator 83 where its density is compared with a standard. The regulator 83 may be arranged to vary the controlling pressure in pipe 26 upon variation in the density of the gas, by varying the leakage of air from a pipe 84 connected to pipe 26. Any suitable density regulator may be here employed but I prefer to use that described and claimed in U. S. Patent No. 1,682,689 to Charles H. Smoot for apparatus for regulating the composition of mixed gases, dated August 28, 1928.

I have now described for one roaster furnace, a complete regulating system constructed according to my invention. In a plant comprising several furnaces it will be understood that each furnace may be similarly equipped with controlling means for the fuel, air, temperature and gas composition, and that these controlling means may be correlated to each other and to those at the other furnaces by the master pressure in chamber 51. In the drawing I have indicated the master as in control of three furnaces; chamber 55 transmitting controlling pressures to furnace 1 as above described, and chambers 85 and 86 transmitting controlling pressures through pipes 87 and 88 respectively to regulating units (not shown) at the other two furnaces. It will be understood that the master pressures in chambers 85 and 86 will vary with that in chamber 51 in the same way as does that in chamber 55; that these pressures in chambers 85 and 86 are independently adjustable by valves corresponding to valve 54; and that the controlling pressures in pipes 87 and 88 are independently adjustable by means of valves corresponding to valves 57a, 58a, and 59a. Although for convenience in the drawing, chambers 85 and 86 are shown smaller than chamber 55, these chambers would in practice be identical therewith.

Where my control system is applied to roaster furnaces of the older type in which the secondary air for combustion is induced through openings in the walls of the furnace, regulating device 34 is, of course, omitted and regulating device 44 is adjusted for the maintenance of a furnace pressure sufficiently below that of the atmosphere to insure adequate in-flow of secondary air.

The gas produced by the various furnaces is delivered through pipes 3, 89 and 90 to the collecting main 5, from which it is distributed through conduits 6 to consuming devices. The amount of gas to be distributed depends upon the number of furnaces in operation at any one time, the consistency of the ore used therein, and upon the ratings of the furnaces. The pressure in main 5 will thus vary from time to time and will be a measure of the gas available for distribution. In plants provided with boosters in pipes 3, 89 and 90, the pressure in main 5 may be above atmospheric pressure. In the type of plant illustrated, the pressure in main 5 is less than atmospheric, and suctional means (not shown) are provided to draw the gas through conduits 6. I utilize the variation pressure within main 5 to control the distribution of gas through pipes 6 to maintain the flows therethrough in proportion to each other and to the quantity of gas available. At 91 I have indicated a master controller, which like that controlling the furnaces, is preferably located on the control board 80. Master controller 91 comprises a chamber 92 to which a restricted flow of air is admitted from the supply pipe 53 and in which the air pressure is controlled by the position of a cup valve 93. Cup valve 93 is carried by one end of a pivoted lever 94, on the other end of which is linked a rod 95 exerting thereupon a force varying with the pressures exerted upon a diaphragm 96 attached to the other end of the rod 95. Diaphragm 96 is exposed to the atmosphere on its lower side and forms the lower wall of a chamber 97 to which the gas pressure in main 5, in this instance a suction, is transmitted through a pipe 98. A spring 94a manually adjustable as shown, exerts a force on lever 94 opposing that of the gas suction in chamber 97 and that of the pressure in chamber 92 acting upon the cup valve. For a fixed adjustment of the spring 94a the pressure in chamber 92 will therefore vary with variations in the suction of the gas main 5; increasing when the gas suction decreases, and decreasing when the gas suction increases. The flow through each conduit 6 is controlled in response to the pressure in chamber 92 by devices which may be similar to device 34. For simplicity a regulating device 99 for only one pipe 6 is shown, but it will be understood, that the flow through each pipe 6 is similarly controlled. Device 99 is diagrammatically illustrated as comprising a pivoted lever, the position of which controls a damper 100 within the pipe, and which is acted upon in one direction by master pressure transmitted through pipe 101 to one side of a diaphragm 102 and in the other direction by the differential of the pressures on either side of a constriction 103 within the pipe as transmitted through pipes 104 and 105 to either side of a diaphragm 106; diaphragms 102 and 106 being connected to opposite ends of the lever by suitable rods. Pipes 107 and 108 transmit controlling pressure to the regulating devices associated with the other conduits 6. It will be understood that the pressure in pipes 101, 107 and 108 may be independently adjusted in respect to the pressure in chamber 92 by adjustment of leakage valves similar to valves 57a, 58a and 59a. Where the magnitude of the gas flows through conduits 6 is small, it may be preferable to substitute multiplicators for the orifice 103, or any other well-known means for obtaining a force measuring fluid flow. Where suctional means are provided for drawing the gas through conduits 6, the damper 100 could be omitted, and the control applied instead to the suctional means.

The operation of my novel control system for roaster furnaces will now be described. Assuming the furnaces to be operating at the ratings for which the regulating apparatus has been set by adjustment of spring 62 associated with cup valve 61, and of the throttle valves 54 associated with chambers 55, 85 and 86, that the ratios between the fuel and air feeds at the various furnaces are constant and those for which valves 57a, 58a, and 59a and the corresponding valves associated with the controlling pressures for the regulating devices at the other furnaces have been set, and that the composition of the gas produced is that desired, then the various regulating devices will be in neutral position under the action thereupon of controlled and controlling forces; the leakage from pipe 84 will be constant and, if the temperature is that desired, no current will flow through the galvanometer associated with the temperature control of each furnace. If now for any reason the pressure in duct 8 increases over that desired, lever 25 becomes unbalanced to partially close damper 24 and to thus return the pressure to its initial value. Similarly if the flow of secondary air varies from that desired, or the pressure within the furnace departs from that of the atmosphere, device 34 or 44 is respectively operated to suitably operate the damper associated therewith. Should the character of the ore fed to furnace 1 change in such a manner as to need less air for its combustion the composition of the gas in conduit 3 will vary; the excess of air reducing the density of the gas. Regulator 83 thereupon increases the leakage through pipe 84 to reduce the controlling pressure in pipe 26. The balance of forces upon regulating device 25 is thus disturbed and the damper 24 is moved thereby to reduce the pressure in air duct 8 proportionately to the change in the controlling pressure. The change in duct pressure reduces the flow of primary air to a value better suited to the changed character of the ore. If this change in primary air flow is not sufficient to restore the density of the produced gas to the desired value regulator 83 further reduces the controlling pressure in pipe 26 to further close the damper 24. If the shift of damper 24 above described reduces the secondary air flow, regulating device 34 becomes unbalanced and operates to open damper 32 to return the secondary air flow to its initial value, and if the temperature has been increased above the desired value by either or both of these operations, the potentiometer circuit becomes unbalanced and a current will flow through the galvanometer in a direction to close contacts 74 and 76 to thereby operate motor 73 in a direction to open damper 70 to restore the temperature to the desired value.

If the furnace ratings decrease for any reason, the suction in the main 5 will increase, lever 94 thereupon operates to partially open valve 93 to reduce the pressure in chamber 92 and to consequently proportionately reduce the flow through each distributing pipe 6.

If it is desired to increase or decrease the rating on all the furnaces proportionately, it is only necessary to correspondingly increase or decrease the tension of spring 62.

In the particular embodiment illustrated the furnaces are maintained at a constant rating determined by the adjustment of spring 62 at the master controller 50, and the gas distribution is varied in response to the gas main suction or pressure controlling master controller 91. If it is desired to control the furnaces in such a manner as to insure a constant pressure or suction in the gas main and therefore a constant gas flow through each distribution pipe, it is only necessary to control the master pressure in chamber 51 similarly to the above described control for chamber 92; and to remove from lever 94, the gas suction responsive device 95, 96 and 97. Such an arrangement wherein the ratings of the furnaces are varied in response to the demand is within the scope of my invention.

My regulating system above described is thus sufficiently flexible to meet the various requirements of a roaster plant. It permits of manual adjustment of the various elements from a central point either together or separately, and automatically maintains the adjustments so made. For simplicity I have shown the various regulating devices as directly in control of the dampers, etc., but I wish it understood that these devices may operate through relay cylinders or other auxiliary power means in the usual manner and that preferably anti-hunting regulators are employed. My invention is not concerned, however, with the particular construction of these devices but with the combination of such known devices whereby co-ordinated control of the roaster plant may be obtained.

I claim:

1. A control system for roaster furnaces provided with air and fuel supplying means, and with a gas delivery pipe, a master controller for creating a plurality of related control pressures, a regulator for the air supplying means, means for controlling said regulator in response to one of said control pressures and to the pressure of the air supply, a regulator for the fuel supplying means, means for controlling said last mentioned regulator in response to another of said control pressures and to the rate at which the fuel is supplied to the furnace, a damper in the gas delivery pipe, and means for controlling said damper in response to the pressure within the furnace, said last mentioned means together with the specified air and fuel supply controls serving to maintain a predetermined ratio between the fuel delivered to the furnace and the air for combustion.

2. The combination according to claim 1 including a device responsive to the composition of the gas produced by the furnace, and means for modifying the control of the regulator for the air supply by said device to maintain the gas composition constant by varying the volume of air relative to the rate at which fuel is supplied.

3. A control system for a roaster plant provided with a plurality of furnaces, with a gas collecting main and with a plurality of gas distributing pipes leading therefrom, comprising in combination master control means responsive to the gas pressure in the collecting main, a regulator associated with each distributing pipe adapted to control the flow of gas therethrough, and means for controlling each of said regulators in joint response to the flow of gas through the associated distributing pipe and to said master control means.

4. In combination with a roaster furnace of the type in which a portion of the air supplied to the furnace is heated thereby without contact with the fuel and is then returned to the furnace as preheated secondary air for combustion, a control system including a regulator for the total air supply, a regulator for the secondary air flow and a master controller for controlling both of said regulators, said master controller being provided with means for adjusting either of said regulators independently of the other to vary the ratio between the primary and secondary air flows to the furnace and with means for adjusting said regulators in unison to vary the combustion rate of the furnace while maintaining constant the ratio between the primary and secondary air supply.

5. In combination with a roaster furnace of the type to which air for cooling and for combustion is supplied from a single source in a single stream and the portion thereof used for cooling is separately withdrawn from the furnace, a regulator for controlling the cooling air so withdrawn from the furnace and means including at least one additional regulator for the air and a device responsive to the temperature of the separately withdrawn cooling air for varying the cooling air by adjustment of said first mentioned regulator without disturbing the volume of air used for combustion.

6. In a roaster furnace provided with an air duct for the admission of air to the furnace, with a rotary fuel feed device and a driving motor therefor, and with a pipe for receiving the gas produced in the furnace, a control system comprising in combination a regulator in the air duct, and a regulator in the gas receiving pipe, means for maintaining a predetermined ratio between the flow of air through the furnace and the rate of fuel fed thereto, said means including a device for adjusting said regulator in the gas receiving pipe to maintain a constant pressure within the furnace and a master controller adapted to adjust the speed of the driving motor for the fuel feed device and the regulator in the air duct to maintain a definite ratio between the air duct pressure and the rate of fuel feed.

7. The combination according to claim 6 including a device responsive to the composition of the gas in the delivery pipe, and means controlled by said device for adjusting the ratio between the flow of air through the furnace and the rate of fuel fed thereto to maintain constant the gas composition.

8. In a roaster furnace provided with fuel and air supplying means and with gas and air withdrawing means, a control system comprising a regulator for each of said means, means for controlling the regulators for the air and fuel supplying means and the gas withdrawing means to maintain a predetermined ratio between the rate of air flow through the furnace and the rate of feed of fuel thereto, and means for controlling the air withdrawing means to maintain the temperature of the furnace constant.

9. In a roaster furnace of the type described wherein all of the air for cooling, and the primary and secondary air for combustion are supplied from a common duct and pass in a common stream into a central hollow shaft within the furnace, a control system including means for maintaining a predetermined ratio between the primary and secondary air flows separated from the common air flow and means responsive to the temperature in said hollow shaft for controlling the quantity of cooling air independently of the air for combustion.

10. The control system according to claim 9 including means responsive to the composition of the gas produced by the roaster furnace for adjusting the ratio between the primary and secondary air flows without disturbing the amount of cooling air.

11. In a roaster plant wherein a plurality of roaster furnaces deliver the gas produced therein to a collecting main from which a plurality of distributing pipes convey the gas to points of use, a control system comprising in combination two master controllers one adapted to automatically control the supply of fuel and air to each furnace, to maintain the same constant, and the other adapted to control the flow of gas through each distributing pipe to vary the same in response to the pressure in the gas collecting main.

12. In a roaster plant wherein a plurality of roaster furnaces deliver the gas produced therein to a collecting main from which a plurality of distributing pipes convey the gas to points of use, a control system comprising in combination two master controllers one adapted to automatically control the supply of fuel and air to each furnace, and the other adapted to control the flow of gas through each distributing pipe, one of said master controllers being responsive to the pressure in the gas collecting main.

In testimony whereof, I have signed my name to this specification.

CYRIL J. KING.